Figure 1:
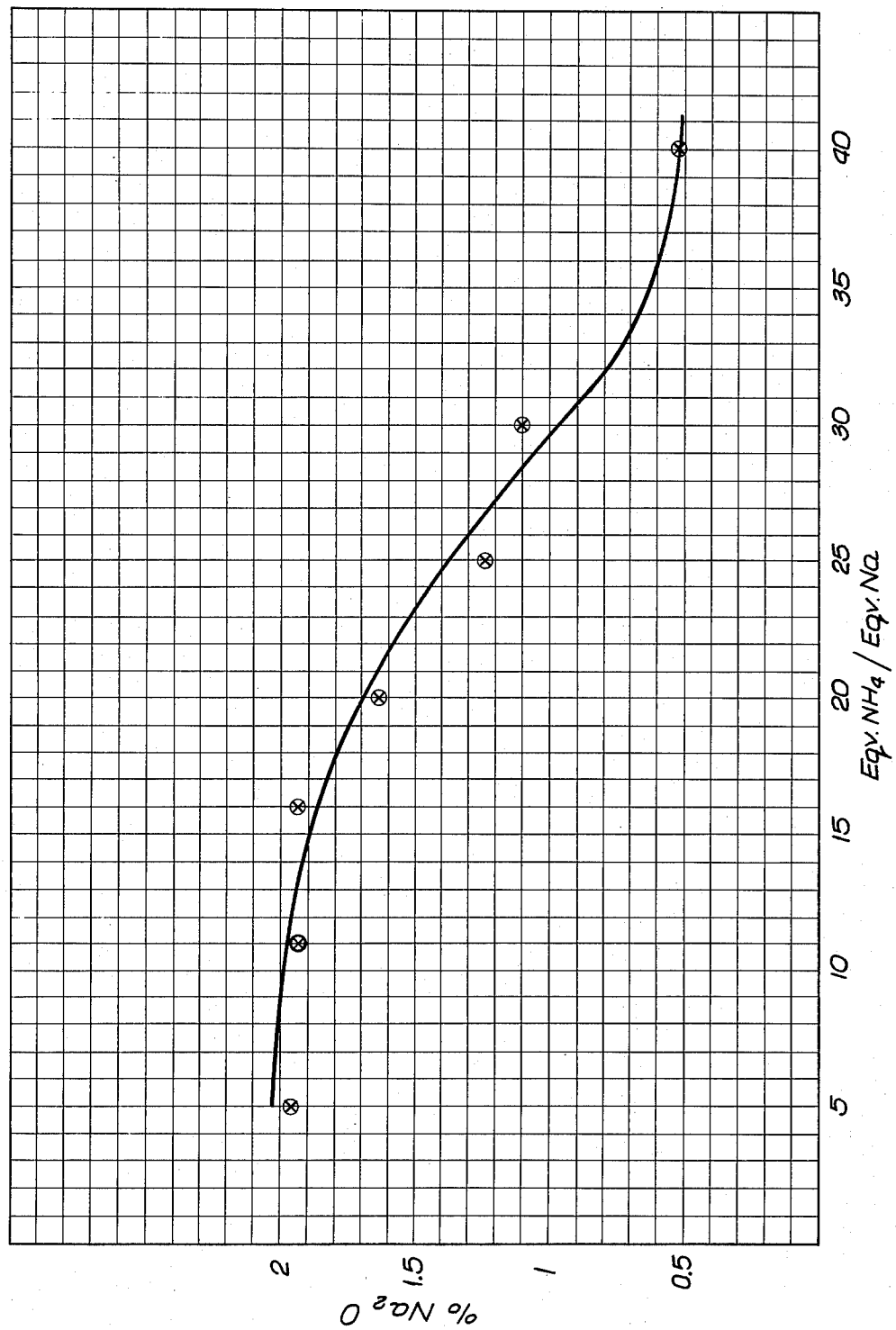

United States Patent [19]
Alafandi et al.

[11] 4,058,484
[45] Nov. 15, 1977

[54] AMMONIUM FAUJASITE ZEOLITES

[75] Inventors: Hamid Alafandi, Woodland Hills; Dennis Stamires, Newport Beach, both of Calif.

[73] Assignee: Filtrol Corporation, Los Angeles, Calif.

[21] Appl. No.: 718,167

[22] Filed: Sept. 9, 1976

[51] Int. Cl.$^2$ .......................... B01J 29/06; B01J 1/04
[52] U.S. Cl. ................................ 252/455 Z; 423/112
[58] Field of Search ..................... 252/455 Z; 423/112

[56] References Cited
U.S. PATENT DOCUMENTS

| | | | |
|---|---|---|---|
| 3,227,660 | 1/1966 | Hansford | 252/455 Z |
| 3,304,254 | 2/1967 | Eastwood et al. | 252/455 Z |
| 3,677,698 | 7/1972 | Sherry et al. | 252/455 Z |

*Primary Examiner*—Carl F. Dees
*Attorney, Agent, or Firm*—Philip Subkow; Bernard Kriegel

[57] ABSTRACT

A process of producing an ammonium zeolite of the faujasite type in which a zeolite of the faujasite type whose exchange sites are substantially entirely occupied by Na cations, is treated with an ammonium salt solution to exchange substantially all of the Na cations with $NH_4$ cations with substantially no impairment of crystallinity by a control of the relation of the equivalents of $NH_4$ in the solution to equivalents of Na in the zeolite.

6 Claims, 1 Drawing Figure

AMMONIUM FAUJASITE ZEOLITES

BACKGROUND OF THE INVENTION

This invention relates to thermally stable zeolites particularly zeolites of the faujasite type which have superior thermal and hydrothermal stability. Faujasite type zeolites have been widely employed in catalytic processes such as processes for the conversion of hydrocarbons and are generally well known. The patent and journal literature is extensive.

In all of these catalyst systems the faujasite type zeolites are produced in the sodium form, that is, the various exchange sites are satisfied by sodium. Such zeolites are described in U.S. Pat. Nos. 2,882,244, usually referred to as X zeolite, and 3,216,789 referred to as a Y zeolite, and also in 3,446,727.

To produce useful catalysts the sodium content must be reduced and this is accomplished by exchange with cations such as ammonium, or hydrogen or polyvalent cations such as alkaline earth and rare earth cations. Commonly, the sodium content of the zeolites employed in catalysts are on the order of about three to about five percent expressed as $Na_2O$. The difficulty with such catalysts are that they have inferior hydrothermal stability. When such zeolites are incorporated in a matrix, and are employed in catalytic processes, they are subjected in a cycle of hydrocarbon conversion and regeneration at high temperatures in the presence of steam and they become severely deactivated. Such catalysts have inadequate thermal and hydrothermal stability.

It has been found in the prior art that sodium zeolites of the faujasite type must be exchanged to produce a product with sodium levels substantially lower than about 1% by weight expressed as $Na_2O$ on a volatile free basis in order that they have adequate hydrothermal stability. This has been accomplished by exchanging the sodium with a cation such as ammonium ion employing a hot solution of an ammonium salt.

The prior art relating to the production of such low sodium zeolites of the faujasite type, referred to in the prior art as ultra-stable zeolites, is extensive and the following U.S. Pat. Nos. are illustrative: Maher et al. 3,293,192 and 3,402,996; Hansford 3,354,077; Sherry 3,677,698.

Maher et al. supra exposes the zeolite to dry calcination temperatures of 1000° F and Ward, 3,781,199 and 3,867,277 carries out the calcination in the presence of steam.

The reduction of the sodium level to below 1% $Na_2O$ in the above prior art, requires the partial exchange of the sodium at substantially lower temperatures of about 100° C before exposing the zeolite to the higher temperature conditions. The resultant partially exchanged faujasite must then be further exchanged to reduce the sodium levels to less than 1% expressed as $Na_2O$.

The resultant zeolite is profoundly altered in crystal structure as is evidenced by substantial change of the $a_o$ lattice constant, see Maher et al supra.

Sherry et al. U.S. Pat. No. 3,677,698 teaches that to reduce the original sodium content of Y zeolite by up to 90% without impairment of crystallinity, the Y zeolite should first be exchanged at a relatively low temperature of 215° F or less to remove 10 to 75% of the original sodium content of the Y zeolite before exposing the partially exchanged zeolite to a further exchange at a higher temperature. Sherry, employing rare earth cations in the exchange process carry out the subsequent exchange at a temperature of 500° F to reduce the Na content to less than 1%.

STATEMENT OF THE INVENTION

We have discovered that contrary to the teachings of the prior art we can, without a prior reduction of the sodium content of a sodium zeolite of the faujasite type, before exposing the zeolite to a high temperature, reduce the sodium content by more than 90% and up to 95% of the original sodium content of the faujasite.

We have found that by the process of our invention we may cause the aforesaid reduction in the sodium content of the zeolite, and also this occurs without any substantial change in the crystallinity either in lattice constant or the degree of crystallinity.

The zeolite produced by the process of our invention has substantially increased hydrothermal stability.

We accomplish this result by carrying out the process of hydrothermal exchange of the sodium in the faujasite zeolite at a temperature far in excess of the temperatures of the boiling point of the reaction solution at atmospheric pressure. This temperature is attained by maintaining the reaction mixture during the entire exchange reaction between the zeolite and exchange solution at superatmospheric pressures.

In the process according to our invention the sodium zeolites of the faujasite type is mixed with a solution of a salt of a cation to be exchanged for the sodium of the zeolite and the exchange process is carried out at superatmospheric pressure so as to cause the exchange to occur at temperatures above 300° F. We have found that temperature substantially below this lower limit or above about 500° F during the exchange process will result in an inferior product as will be set forth below. We have also found that in order to produce the zeolites of low sodium level, for example, in the range of 1% or less, expressed and $Na_2O$ based upon the weight of the volatile free (VF) zeolite without a substantial destruction of the crystallinity of the zeolite, it is desirable to maintain the ratio of the equivalents of the exchange cation to the sodium in the zeolite within a specified range depending upon the nature of the cation.

While the process of our invention, it may be carried out using any exchange cation, such as have been used in exchanging the sodium zeolites for use in catalysts, for example, ammonium, hydrogen, polyvalent cations such as alkaline earth, nickel, cobalt, molybdenum or rare earth cations, we prefer to employ an acid solution of an ammonium salt of a strong acid, for example, ammonium chloride or ammonium nitrate or ammonium sulfate.

We have found that in order to obtain an exchange of the sodium in the faujasite, for example, of the Y type (see Patent No. 3,130,007) to reduce the $Na_2O$ to less than 1.5%, the temperature should be kept within the range of about 300° F and less than about 500° F, and that the ratio of the equivalents of the ammonium cation to the equivalents of the original sodium cation in the zeolite employed in the reaction mixture should be in excess of about 20. The concentration of the $NH_4$ cation per liter of solution will depend on the concentration of the zeolite solids in the slurry as well as the sodium content of the zeolite.

We have found that where the ratio of the equivalents of ammonium to sodium is less than 10, the temperature required to bring the sodium level in the zeolite to less than 1% Na₂O results in a destruction of the crystal structure of the zeolite.

Where in this specification and in the claims we refer to the sodium content of the zeolite charged to the reaction, we mean the content of sodium cations in exchange sites in the faujasite zeolite.

The Y zeolite which is exchanged in the process of our invention is one which contains the Na present as cations when it is produced by the processes as described in the said U.S. Pat. No. 3,130,007, or application Ser. No. 696,889 filed June 17, 1976 of which one of us is an applicant. Said application is herein incorporated by this reference. The Y zeolite has a silica to alumina ratio in the range of 3 or more, usually up to about 6. The sodium content is usually in the range of $0.9 \pm 0.2$ per mol of the zeolite expressed as:

$0.9 \pm 0.2$ Na₂O.Al₂O₃.3-6 SiO₂.

Due to variations in the reactants and other parameters of the reaction, as well as the uncertainty in the analytic procedures, the value of the components of the constitutional formula may not be more accurately stated. We wish to exchange the Y zeolite as produced with its original Na content. Where we refer to the sodium Y (NaY) which is charged to the exchange reaction of our invention, we mean the product as produced which has not undergone an exchange reaction to reduce the original sodium content in any substantial degree.

The temperature should be above 300° F, and less than 500° F and preferably between 350° F and 450° F, and the ratio of the equivalents of ammonium cation, in the solution employed, to the equivalents of sodium originally in the zeolite charged to the reaction mixture, should be suitably in excess of 30. An increase in concentration beyond 30 equivalents may be employed. We prefer to carry out the reaction within the range of 30 to 40 equivalents of ammonium ion per equivalent of sodium ion in the zeolite employed in the reaction mixture. We may obtain this ratio by adjusting the concentration of the zeolite solids in the reaction mixture and the concentration of the ammonium salt. We have found that there is no substantial advantage in employing a concentration of ammonium ion or zeolite to give a ratio of the ammonium ion equivalents per equivlent of sodium ion of more than about 40.

We have also found that it is desirable to carry out the exchange in an acid condition, suitably a pH in the range of about 2½ to about 5, for example, a pH between 3 and 4.

Under these conditions we have been able to obtain a Y zeolite with about 1% or less by weight of sodium expressed as Na₂O based on the exchanged zeolite, volatile free. The process does not result in any substantial impairment of the crystallinity of the exchanged zeolite, and we may obtain an ammonium Y which analyzed 1% and less down to ½% Na₂O. The crystallinity of the exchanged zeolite was substantially the same as the crystallinity of the sodium Y as evidenced by their X-ray patterns, and with but minor reduction in surface area. The resultant product shows excellent thermal and hydrothermal stability.

The products produced according to our invention are useful for absorbents, and are useful as ingredients in catalysts in place of the prior art zeolites of the faujasite type to produce catalysts of substantially greater catalytic activity when subjected to steaming conditions such as substantially impair the catalytic acitivity of the prior art catalysts.

The following example, taken together with FIG. 1, illustrates our invention but is not to be taken as limitations thereof, but states our presently preferred procedure for producing the stable zeolite of our invention.

EXAMPLE 1

The sodium Y charged to the exchange, analyzed as 14.1% Na₂O on a volatile free basis (VF), and a silica to alumina ratio of 4.4 (calculateed as .97 Na₂O.Al₂O₃.4.4 SiO₂) and an $a_o$ of 24.67 was dispersed in 1400 ml of a solution containing 1400 grams of ammonium nitrate, anhydrous bases, equivalent to 13, equivalents of NH₄ ion per liter.

The analytical results as well as the $a_o$ lattice constant indicated that substantially all of the exchange sites were occupied by sodium. The slurry contained 100 grams, volatile free, of the above sodium Y (containing 0.455 equivalents of Na) to give a solids content of 6.6% and a ratio of equivalents of ammonium cation in the solution per equivalent of the sodium cation in the zeolite of 40. To this mixture was added sufficient nitric acid to bring the solution to a pH of 3.5. The mixture was heated in an autoclave under autogenous pressure to a temperature of 350° F. for six hours. The mixture after cooling was filtered and the solids were washed with distilled water substantially free of nitrate anions.

The product analyzed on a volatile free basis had the following composition:

Na₂O = 0.5% by weight
NH₃ = 7.5% by weight
Al₂O₃ = 23.5% by weight
SiO₂ = 61.0% by weight The unit cell composition calculated from said values is as follows: Na₂ (NH₄)₅₆ H₃ [AlO₂]₆. [SiO₂]₁₃₁ and its constitutional formula:

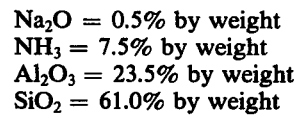

[(Na).₀₂ (NH₄)₁.₉₁.(H).₀₇]0.Al₂O₃.4.4 SiO₂

EXAMPLE 2

A sample of the sodium Y such as used in Example 1, and which has been exchanged by conventional exchange at ordinary temperatures, i.e. below 100° C, with ammonium ion to a sodium content off 3% by weight expressed as Na₂O on a volatile free basis, and which showed the crystallinity pattern of Y was calcined at 1000° F, and a separate sample of the same exchange zeolite was calcined at 1600° F both for 3 hours in air. The sample calcined at 1000° F retained its crystallinity but the sample which is calcined at 1600° F was amorphous showing no peaks on its X-ray pattern. The sample produced, according to Example 1, was similarly calcined at the above two temperatures and showed in each case excellent crystallinity as evidenced by X-ray pattern with good well formed peaks of intensity substantially similar to that of the uncalcined product.

EXAMPLE 3

The thermal stability of the exchanged zeolite produced, according to the process of our invention, is further illustrateed by the relatively small change in the surface area of the exchanged zeolite as the temperature of calcination is increased. Various samples of zeolite exchanged according to the process of our invention, according to the procedure set forth in Example 1, in which the NaY has been reduced to Na$_2$O content of 0.6% expressed as above, was divided into several samples and separately calcined in air at temperatures of between 1000° to 1600° F for the same period of time. The following Table 1 reports the temperature of calcination and the surface area of the calcined product.

TABLE 1

| Temperature ° F | Surface Area* |
|---|---|
| 1000 | 572 |
| 1200 | 521 |
| 1400 | 564 |
| 1490 | 516 |
| 1600 | 470 |

The surface area is reported in Table 1 as square meters per gram employing the method described in the article by P. H. Emmett in "Advances in Catalysis", Vol. 1, 1948, pp. 64–89, Academic Press, N.Y.

As is shown in Example 2, the zeolite of 3% Na$_2$O had lost its crystallinity when heateed to 1600° F (871° C).

The improvement in the thermal stability of the ammonium zeolite exchanged according to the process of our invention, and resulting from the reduction of the sodium in the zeolite below about 1% Na$_2$O, is evidenced by the increase in the temperature required to cause a phase change in the zeolite.

EXAMPLE 4

Four samples were produced by the procedure of Example 1 to reduce the sodium to levels shown below by adjusting the concentration of the ammonium salt and the solids in the slurry as well as the temperature and duration of exchange. The zeolites have the following sodium content as shown in Table 2. The sample were subjected to a standard differential thermal analysis, and the 900° C exotherm peak determined. The results are given in the following Table 2.

TABLE 2

| Sample | % Na$_2$O VF | DTA ° C |
|---|---|---|
| 1 | 3.2 | 925 |
| 2 | 2.6 | 952 |
| 3 | 1.7 | 965 |
| 4 | .6 | 975 |

The substantial increase in the temperature required to cause a transformation of the zeolite into what is believed to be mullite, is evidenced from the Table.

EXAMPLE 5

The thermally and hydrothermally stabilized zeolite produced according to the process of our invention (see below Sample 1), show a large decrease in the pores of less than 45 Angstrom and a large increase in the pores of greater than 600° Angstrom. Sample 1 as produced by the process of Example 1 to reduce the Na to a Na$_2$O content of about 0.5%, was calcined at 1000° F for 2 hours and then steamed at 1490° F for over 3 hours. Sample 2 is the original sodium Y employed in Example 1.

TABLE 3

| | Total PV* cm$^3$/gram | % PV* >600 A diameter | % PV* <45 A diameter | SA** M$^2$/gram |
|---|---|---|---|---|
| Sample 1 | 0.54 | 24 | 48 | 565 |
| Sample 2 | 0.40 | 7.5 | 24 | 718 |

*PV Pore volume in pores of pore diameter in angstroms determined by the test described by E.P. Barrett etc., J.A.C.S., Vol. 73, p. 373 et seq. (1951).
**SA Surface (meters square per gram) area determined by the method described above.

The hydrothermal stability of the ammonium exchanged zeolite of our invention is further illustrated by the retained crystallinity when subjected to the high temperature steaming conditions.

EXAMPLE 6

A sodium Y as in Example 1, was exchanged as in Example 1 to Na$_2$O content of the exchanged zeolite on a volatile free basis of 0.54%. It was calcined at 1000° F for 3 hours. Samples of the calcined zeolite were exposed to steam at temperatures as shown in Table 4. The zeolite retained its crystallinity up to temperatures about 1250° F over prolonged periods of time, and showed an X-ray pattern similar to that of the original uncalcined product. The lattice structure of the steamed zeolite as shown by their X-ray pattern, was retained substantially constant irrespective of the temperatures of steaming operations in the range of from about 1000° up to about 1250° F.

TABLE 4

| Temperature of Steaming ° F | Duration Hours | a$_o$ |
|---|---|---|
| 1050 | 6 | 24.37 |
| 1150 | 6 | 24.36 |
| 1250 | 6 | 24.35 |

EXAMPLE 7

To illustrate the increased hydrothermal stability of the zeolite produced according to the process of our invention, a sample of the zeolite produced, according to the process of Example 1, and containing 0.64% of sodium expressed as Na$_2$O on a volatile free basis, while still in the slurry form after washing as in Example 1, and without further treatment was slurried with alumina produced and peptized with formic acid, and to this slurry, was added ball clay and acid treated halloysite as described in the copending application Ser. No. 696,889. The components were mixed and spray dried as described in said application. Said application is incorporated herein for the said purpose. The ratio of components on a volatile free basis was as follows: 19% zeolite, 18% Al$_2$O$_3$, 47% ball clay and 16% acid treated halloysite.

A like composition was made except that the zeolite was produced by conventional exchange with an ammonium salt to reduce the sodium content of 3.5% Na$_2$O and another to 4.5% on a volatile free basis.

The samples were treated by M steaming at 1450° F and s + steaming at 1550° F each for two hours and then tested according to the microactivity act described in Oil and Gas Journal of 1966, Vol. 64, No. 39, pp. 7, 84 and 85, and Nov. 22, 1971, pp. 60–68. The results are given in Table 5.

TABLE 5

| % Na$_2$O in Zeolite | M. Steaming | S + Steaming After M |
|---|---|---|
| 0.64 | Vol. % Conv. 73 | Vol. % Conv. 60 |

TABLE 5-continued

| % Na₂O in Zeolite | M. Steaming | S + Steaming After M |
|---|---|---|
| 3.5 | 69 | 29 |
| 4.5 | 66 | 19 |

The much greater hydrothermal stability of the zeolite produced according to our invention, is shown by the greater retention is catalytic activity.

A particularly useful property of the above catalyst is its resistance to metal poisoning when compared with catalysts of higher sodium content. Resistance to poisoning by heavy metal such as vanadium is an important property of a highly useful catalyst. The resistance to poisoning of the catalyst of my invention is illustrated by the following example.

EXAMPLE 8

The catalyst produced according to Example 7 employing, however, zeolites produced according to Example 1, and containing 0.64% by weight expressed as Na₂O on a volatile free basis (Sample 1), was treated with various quantities of vanadium. Another sample of catalyst produced by exchanging Y zeolite with NH₄ and rare earth to an Na₂O content of 4.5% (Sample 2). Both samples were poisoned by a heavy metal as is conventional in such tests. The catalyst, produced as in Example 7, after spray drying, were treated with vanadium napthnate dissolved in gas oil in a quantity sufficient to deposit vanadium as shown below. The treated catalyst both, Sample 1 and Sample 2 were each calcined at 1000° F for 1 hour and then exposed to steaming at 1250° F for 2 hours and were then subjected to the above cracking tests. (See Example 7). The activities (% conversion) of Sample 1 and Sample 2 with various levels of vanadium as given in the following Table 6.

TABLE 6

|  | 0% V* | 1% V* | 2% V* | 3% V* |
|---|---|---|---|---|
| Sample 1 | 77% | 70% | 58% | 40% |
| Sample 2 | 78% | 57% | 28% | 17% |

*Percent by weight of Vanadium (V) is expressed as metal on a volatile free basis. The percent conversion of Sample 1 and Sample 2 is given in Volume % according to the aforesaid microactivity test.

The following examples are for the purpose of illustrating our discoveries as to the effect of the various parameters which control, and the results which may be obtained by employing our process of high temperature exchange of the zeolite, whose exchange sites are occupied by sodium. The data here presented is also illustrative of the useful variations in the parameters to produce stable ammonium exchanged sodium zeolites.

EXAMPLE 9

The procedures of Example 1, employing the Y zeolite of Example 1 was followed but the ratio of the equivalents of ammonium to the equivalents of sodium in the zeolite and the concentration of the ammonium ion were adjusted to give the specified ratios, in the seven different runs reported in the following Table 7. The Na Y employed had a surface area of 740 square meters per gram when measured by the above test.

TABLE 7

| | Reaction Conditions Reactant Ratios | | | | |
|---|---|---|---|---|---|
| Equiv. NH₄ per Equiv. Na on Zeolite VF | Equiv. of NH₄/liter of charge | Temp. °F | % Solids | Product Na₂O % by Weight on Product | Surface Area m²/gr. |
| 5 | 1.63 | 350° F | 6.6% | 1.96 | 589 |
| 10 | 3.3 | " | " | 1.94 | |
| 15 | 4.9 | " | " | 1.93 | 612 |
| 20 | 6.5 | " | " | 1.63 | |
| 25 | 8.1 | " | " | 1.26 | 655 |
| 30 | 9.8 | " | " | 1.11 | 636 |
| 40 | 13. | " | " | 0.52 | 627 |
| 168 | 11.8 | " | 1.5% | .52 | |

The above results are plotted on Fig. 1.

It will be observed that under the conditions of the above Example 9, the reduction to 1.5% or less of Na₂O is attained when the ratio of the equivalents of NH₄ in the solution per equivalent of the Na in the zeolite is in excess of 20, and that increasing the ratio above 40 does not result in a further reduction. The reduction of the sodium to a level of 1% expressed as Na₂O is attained as is shown in the table and FIG. 1 when the ratio is above about 30. This is also shown in FIG. 1.

The values of concentration of the NH₄ ion in the solution is a function of the said ratio and the concentration of zeolite solids, as well as the Na content of the zeolite. The experiment with a ratio of 168 shows that no substantial improvement is obtained in this example by increasing this ratio above about 40.

The preservation of the surface area by the process of our invention, is evidenced by the relatively small change in the surface area from the zeolite Y charged to the exchange process. The data shows that the exchange, by the process of our invention, results in substantial preservation of the crystallinity of the Y zeolite. The reduction in surface area from about 740 square meters per gram for the sodium Y zeolite charge to the process, to about 630 for the preferred conditions of 30 to 40 ratio of equivalents of ammonium cations to sodium cation, indicates a reduction of less than about 14% of the surface area of the sodium Y charged to the process.

EXAMPLE 10

The effect of temperature in the exchange reaction is illustrated in the following examples in which the procedures of Example 1 was followed, except that the temperatures was different in each of the seven runs.

TABLE 8

| Temp. °F | % Na₂O left in Zeolite |
|---|---|
| 250 | 198* |
| 300 | 1.38* |
| 350 | 0.52* |
| 400 | 0.77* |
| 450 | 0.74** |

TABLE 8-continued

| Temp. °F | % Na$_2$O left in Zeolite |
|---|---|
| 500 | 0.87*** |

*Good crystallinity by X-ray defraction, strong welll shaped peaks of good intensity.
**Weak Y peaks of low intensity.
***No structure by X-ray.

The accuracy of the above analysis for Na$_2$O at levels of substantially less than 1% Na$_2$O is usually ± 0.2 and thus the exchange at temperatures above 400° F may be taken as substantially equivalent.

The crystallinity, as measured by X-ray peak intensities of the samples produced at temperatures of 350° F and less, is substantially the same as starting material. However, the product produced at 450° F shows substantial destruction of crystallinity as shown by X-ray and no structure is apparent in the X-ray spectogram where the temperature of 500° F was employed. The following experiment illustrates that the temperature above 450° F is destructive of crystallinity whether the equivalents of ammonium to the equivalents of sodium is maintained at the high level of 40 equivalents, or at a much lower level.

Where the ratio of the equivalents of the NH$_4$ cation to the sodium cations is low, the temperatures must be increased excessively in order to reduce the Na$_2$O to less than 1%.

EXAMPLE 11

In this example the procedure of Example 1 was followed to reduce the Na to less than 1% expressed as Na$_2$O, except that the slurry contained ammonium salt in a ratio of ammonium cation to sodium cation of substantially less than 40, but with the same zeolite solids in the slurry (Example 7) as in Example 1, and the temperature was adjusted for each of two runs reported in the following table. It is compared with the 40 equivalent tests of Table 7.

TABLE 9

| Equiv. of NH$_4$ Per Equiv. of Na | Equiv. of NH$_4$/liter | Temp. | % Na$_2$O in Product VF | Crystallinity |
|---|---|---|---|---|
| 4 | 2.8 | 500 | 3.6 | Amorphous |
| 10 | 7 | 560 | 0.6 | Amorphous |
| 10 | 7 | 350 | 1.94 | Good |
| 40 | 13 | 350 | 0.52 | Good |

The effect of the time upon the extent of exchange is illustrated by the following example.

EXAMPLE 12

The process of Example 1 was carried out except that the reaction time was varied for each of the five runs reported in the following table.

TABLE 10

| Time in Hours | % Na$_2$O in Zeolite |
|---|---|
| 2 | 1.65 |
| 4 | 1.4 |
| 6 | 0.64 |

The above data illustrates the results which may be obtained by the procedure of our invention, whereby the exchange process is carried out at a high temperature in which a mixture of a sodium zeolite of the faujasite type, particularly Y, in which the Na is replaced by NH$_4$ in an acidified equeous slurry of the zeolite, and in which the exchange process proceeds to replace substantially the entire sodium content of the zeolite in the slurry by an exchange at temperatures above the normal boiling point of the solution under autogenous pressures.

We have found that in order to reduce the sodium content of the zeolite expressed as Na$_2$O on a volatile free basis to about 1% or less by weight of the zeolite, the ratio of the NH$_4$ in the salt solution and the concentration of solid zeolite in the solution should be controlled so that the equivalents of NH$_4$ ion per equivalent of Na in the zeolite charged, be about 30 or more. For example, in the range of about 30 to about 40. The concentration of the ammonium salt in the solution or the concentration of the zeolite solids or both the concentration of the ammonium salt and the concentration of the solids in the slurry, are adjusted to give this ratio. The temperature of the reaction should be controlled to above 300° and less than 500° F, for example, in the range of about 350° F to about 400° F, and the reaction is continued preferably to reduce the Na in the zeolite to about 1% or less, expressed as Na$_2$O on a volatile free basis.

The preferred condition for the exchange of the sodium Y is to charge the sodium Y to a reaction mixture of a water solution of an ammonium salt at a pH of 3.5 employing a concentration of the salt and the zeolite to establish a ratio of the equivalents of NH$_4$ ion in the solution, to the equivalents of Na in the zeolite charged of about 40, and heat the mixture to a temperature of about 350° F and maintain the reaction mixture for a time sufficient to reduce the Na content of the zeolite to a value of less than about 1%, expressed as Na$_2$O on a volatile free basis.

According to our tests, the time required is suitably about 6 hours.

In this specification, except as specified, percentages are given on the weight basis.

Since samples of Y and purity of the materials vary, it may be found that the exact controls of concentration, time and temperature for best results may vary.

Small scale bench autoclave tests performed, according to the above examples, will determine the best parameters for producing a Y zeolite of good crystallinity and hydrothermal stability by reducing the sodium of the Y zeolite as described above.

While we have described our process employing an autoclave, it is understood that the process may be carried out in more than one stage and in more than one vessel, or continuously with suitable pressure control provided that the entire exchange process is carried out under the controlled conditions specified above.

We claim:

1. A method of producing ammonium zeolites of the faujasite type which comprises mixing a zeolite of the faujasite type whose exchange position is substantially entirely occupied by Na cations with a solution of an ammonium salt, the quantity of the zeolite, and the concentration of the ammonium cations, being in quantity sufficient to establish a ratio of the equivalents of NH$_4$ cation in the solution, per equivalent of Na cation in the zeolite in the mixture in excess of about 25, heating the solution to a temperature above about 300° and less than about 450° F for a period of time to reduce the sodium content of the zeolite, expressed as Na$_2$O, to less than about 1.5% by weight of the exchanged zeolite, on a volatile free basis, and washing the zeolite substantially free of cations of the salt in solution.

2. In the process of claim 1, in which said solution is acid of a pH being between about 2.5 and 5, and said equivalents of the $NH_4$ ion to the sodium ion in the zeolite being within the range of above about 30 up to about 40, for a period of time sufficient to reduce the Na in the zeolite, expressed as $Na_2O$, to less than 1% by weight of the zeolite on a volatile free basis.

3. The process of claim 1, in which the zeolite is Na Y zeolite, and in which the ammonium zeolites produced has substantially all of said Na replaced by $NH_4$ cations, and in which crystallinity of the ammonium zeolite is substantially the same as the Na zeolite which has been exchanged in the reaction.

4. In the process of claim 2, in which the zeolite is Na Y zeolite, and in which the ammonium zeolites produced has substantially all of said Na replaced by $NH_4$ cations, and in which the crystallinity of the ammonium zeolite is substantially the same as the Na zeolite which has been exchanged in the reaction.

5. In the process of claim 1, in which said solution is acid at a pH being between about 3 and 4, and said equivalents of the $NH_4$ ion to the sodium ion in the zeolite being within the range of above about 30 up to about 40, and the temperature being between above 300° F and less than about 450° F, for a period of time sufficient to reduce the Na in the zeolite, expressed as $Na_2O$, to less than 1% by weight of the zeolite on a volatile free basis.

6. The process of claim 5, in which the zeolite is Na Y zeolite, and in which the ammonium zeolites produced has substantially all of said Na replaced by $NH_4$ cations, and in which the crystallinity of the ammonium zeolite is substantially the same as the Na zeolite which has been exchanged in the reaction.

* * * * *

UNITED STATES PATENT AND TRADEMARK OFFICE
CERTIFICATE OF CORRECTION

PATENT NO. : 4,058,484
DATED : November 15, 1977
INVENTOR(S) : Hamid Alafandi and Dennis Stamires It is certified that error appears in the above-identified patent and that said Letters Patent are hereby corrected as shown below:

Col. 2, line 39, change "and" to --as--

Col. 4, line 14, change "bases" to --basis--
Col. 5, line 38, change "sample" to --samples--
Col. 5, line 58, change "600°" to --600--
Col. 6, line 57, change "of" to --to--
Col. 6, line 61, change "act" to --test--
Col. 7, line 39, insert --was-- before "produced"
Col. 7, line 44, correct the spelling of "naphthnate" to --Naphthanate--
Col. 8, line 62, change "seven" to --six--
Col. 9, line 36, change "two" to --the--
In Claim 1, Col. 10, line 68 change "cations" to --anions--

Col. 7, line 42 change "catalyst" to --catalysts--
Claim 3, Col. 11, line 12 insert --the-- before "crystallinity."

Signed and Sealed this

Eighth Day of August 1978

[SEAL]

Attest:

RUTH C. MASON
Attesting Officer

DONALD W. BANNER
Commissioner of Patents and Trademarks